No. 777,513. PATENTED DEC. 13, 1904.
J. C. JACOBY.
TWINE HOLDER.
APPLICATION FILED FEB. 15, 1904.
NO MODEL.
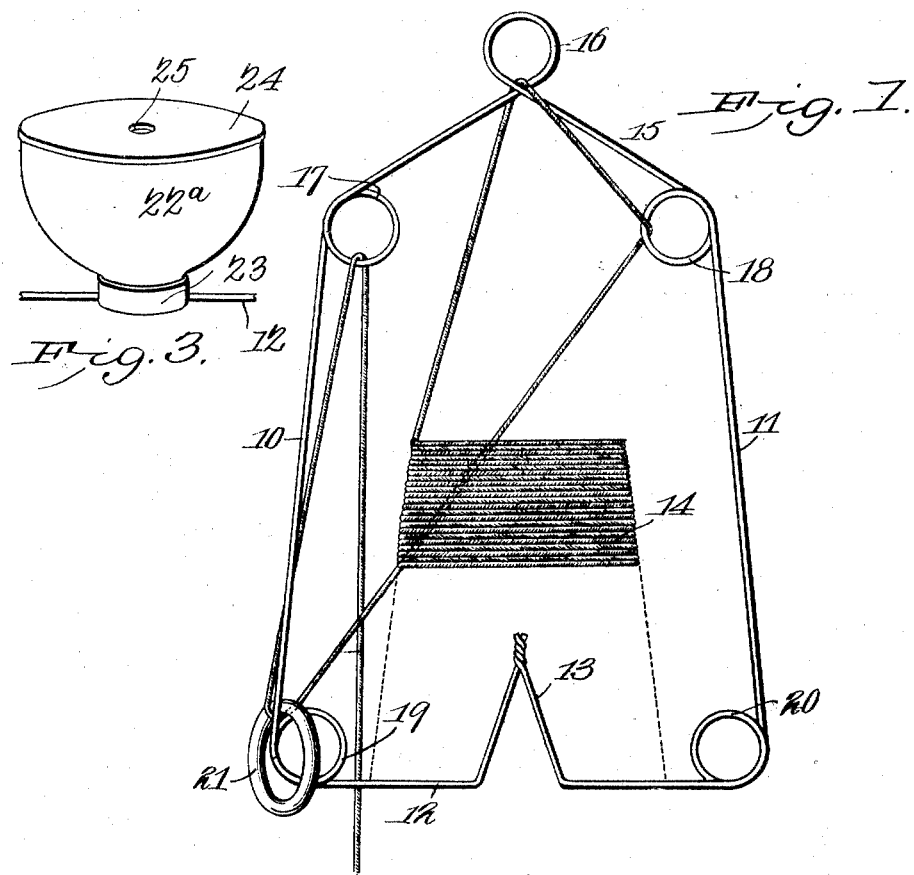
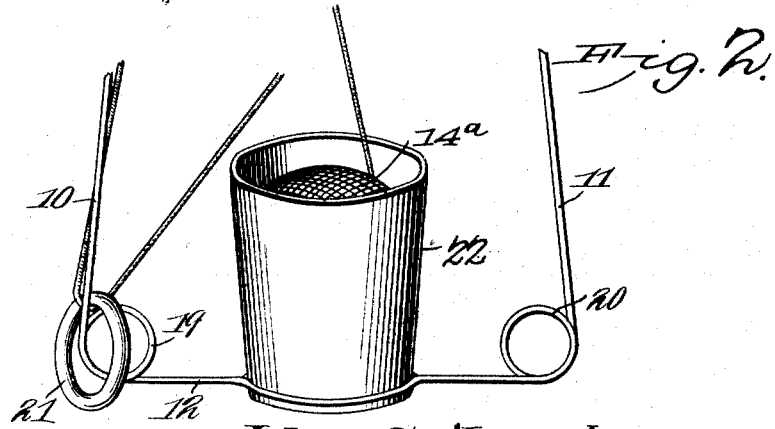
Witnesses
E. F. Stewart
C. H. Woodward
John C. Jacoby, Inventor.
by C. A. Snow & Co.
Attorneys No. 777,513. Patented December 13, 1904.

UNITED STATES PATENT OFFICE.

JOHN C. JACOBY, OF ASHLAND, OHIO, ASSIGNOR TO MARTHA L. JACOBY AND CHARLES W. McCOOL, OF ASHLAND, OHIO.

TWINE-HOLDER.

SPECIFICATION forming part of Letters Patent No. 777,513, dated December 13, 1904.

Application filed February 15, 1904. Serial No. 193,704. (No model.)

*To all whom it may concern:*

Be it known that I, JOHN C. JACOBY, a citizen of the United States, residing at Ashland, in the county of Ashland and State of Ohio, have invented a new and useful Twine-Holder, of which the following is a specification.

This invention relates to improvements in devices for supporting balls or "cones" of wrapping-twine, and has for its object to provide a simply-constructed and conveniently-arranged frame whereby while supporting the ball or cone in convenient position for use will automatically maintain the free end of the twine in an elevated position out of the way when not being used; and the invention consists in certain novel features of construction, as hereinafter shown and described, and specified in the claim.

In the drawings illustrative of the invention, in which corresponding parts are denoted by like designating characters, Figure 1 represents a side view of the device complete. Figs. 2 and 3 are perspective views of a portion of the device, illustrating modifications in the construction of the twine-support.

The improved device comprises a frame of a single piece of resilient wire having substantially vertical side members 10 11 and horizontal bottom member 12, the latter having bent centrally therein a tapered projection 13, forming a resilient support for the twine. For the purpose of illustration a cone of twine is shown in position at 14 upon the support 13.

The upper portion 15 of the frame is preferably tapered and bent into a combined suspension and guide loop 16, while resilient guide-loops 17 18 are bent into the frame at the juncture of the upper portion 15 and the side portions 10 11, as shown. Loops 19 20 will also be preferably bent into the frame at the juncture of the bottom member 12 and side members 10 11, as shown.

A weighted ring 21 of relatively large diameter is slidably disposed upon one of the side members 10 or 11, as, for instance, the member 10.

The twine from the cone 14 is threaded through the loops 16 18 17 in the order named and likewise carried through the ring 21 as it is passed from the loop 18 to the loop 17, as shown, and when thus arranged the various loops will offer sufficient resistance to provide the requisite tension to prevent the twine from unwinding too freely. When the twine is to be used, the required quantity is drawn from the cone 14, this action causing the ring 21 to be elevated until it engages the loop 17, but will not impede the passage of the twine, as any desired amount can be drawn from the cone. When the twine is severed and the end released, the ring 21 will possess sufficient weight to draw the slack twine downwardly into the position shown in full lines in Fig. 1 and elevate the severed end into position sufficiently far above the counter to be out of the way, but in convenient position for use when again required.

The device is intended more particularly for use in retail stores where goods are to be wrapped, but may be used in any locality where required. It will be noted that by the arrangement shown an extremely simple and inexpensive structure is produced which may be quickly and readily installed and which will effectually support the cone of twine in convenient position for use and automatically elevate the severed end when not in use. The resilient portions 17 18 serve an important purpose as tension-guides for the twine and also as "springs" to maintain the sides of the support 13 pressed outwardly to hold the cone 14 with sufficient firmness to prevent accidental displacement.

In Fig. 2 a cup-like receptacle 22 is provided for a ball of twine $14^a$, which may be employed under some circumstances, if required. In Fig. 3 another form of the twine-ball cup, $22^a$, is shown supported by a band 23, attached to the member 12, this cup having a detachable cover 24, provided with a twine-guide aperture 25, as shown.

Having thus described the invention, what I claim is—

A twine-holder comprising a frame of wire having substantially vertical sides and a horizontal lower member, a cord-support upon said lower member, and a central guide and suspension loop bent into the upper member, said frame having resilient guide-loops bent therein at the juncture of said side and upper members, and a weighted ring slidable upon one of said side members, whereby means are provided for supporting the twine with the requisite tension and to cause the free end of the twine to be automatically supported above the counter when not in use.

In testimony that I claim the foregoing as my own I have hereto affixed my signature in the presence of two witnesses.

JOHN C. JACOBY.

Witnesses:
S. L. ARNOLD,
J. E. ARNOLD.